Oct. 7, 1941.  A. PINTO  2,257,809
CONTROL SYSTEM FOR ELECTRIC MOTORS
Filed April 25, 1941  3 Sheets-Sheet 2

Anthony Pinto  INVENTOR
BY Walter E. Bradley  ATTORNEY

Oct. 7, 1941.　　　　　A. PINTO　　　　　2,257,809
CONTROL SYSTEM FOR ELECTRIC MOTORS
Filed April 25, 1941　　　3 Sheets-Sheet 3

Anthony Pinto　　INVENTOR

BY　Walter S. Bradley　ATTORNEY

Patented Oct. 7, 1941

2,257,809

UNITED STATES PATENT OFFICE 2,257,809

CONTROL SYSTEM FOR ELECTRIC MOTORS

Anthony Pinto, New Rochelle, N. Y., assignor to Otis Elevator Company, New York, N. Y., a corporation of New Jersey Application April 25, 1941, Serial No. 390,213

8 Claims. (Cl. 172—152)

The invention relates to control systems for motors, especially motors used in elevator systems for raising and lowering the car.

In elevator installations, the hoisting motor may be a direct current motor or an alternating current motor, depending upon the characteristics of the installation. In some cases where the supply of power to the building is polyphase alternating current, especially for slow speed installations, a polyphase alternating current hoisting motor is utilized and in many of such installations resistance is provided in circuit with the motor which is short-circuited in steps to accelerate the car. Also, in some cases where the power supply to the building is direct current, "resistance control" installations are made in which the motor is supplied with current directly from the supply mains and resistance provided in circuit with the motor armature is short-circuited in steps to accelerate the car. In other instances, especially with higher speed installations, a system is provided in which a direct current hoisting motor is supplied with current from a variable voltage direct current generator driven by a motor supplied with current from the building supply mains, which may be either alternating or direct current. Resistance is provided in circuit with the generator field winding, or in some instances in circuit with the field winding of an exciter which applies voltage to the generator field winding, and this resistance is short-circuited in steps to accelerate the car. Other arrangements may be provided in which acceleration is controlled in steps.

In the case of the direct current power supply resistance control installations, the usual arrangement for retarding the car is to connect by-pass resistance across the motor armature and resistance in series with the motor armature and to control these resistances in steps. In the case of the variable voltage installations, control resistance is inserted in steps with the generator or exciter field winding to effect retardation. In the case of alternating current motors, retardation is usually effected by employing a two speed motor and connecting from the fast speed to the slow speed windings. Other arrangements may be provided in which retardation is controlled in steps.

It is desirable that the accelerating steps be timed. Also in many instances the retardation steps are timed.

It is the object of the invention to provide a simple but reliable control of the timing in such systems.

The invention involves the utilization of electronic tubes for timing acceleration. In carrying out the invention according to arrangements which will be described, electronic tubes of the cold cathode gas filled type with grid control are utilized. Direct current of a voltage value less than the break-down voltage of the tube is impressed on each tube. The tube is caused to operate by applying sufficient voltage across the grid-cathode to cause the tube to fire. The firing of the tube is delayed by a condenser connected across the grid and cathode and resistance connected in circuit with the condenser. The voltage drop across the resistance delays the charging of the condenser and thus the building up of the voltage across the grid-cathode of the tube. When this voltage attains the firing value, the tube operates to pass sufficient current to cause the operation of the accelerating switch controlled thereby. The switch upon operation establishes a holding circuit through resistance of a value to reduce the voltage across the tube to below sustaining value, causing the tube to cease conducting current. Each accelerating switch upon operation completes the circuit for the next thereby obtaining a sequence of operation. For timing the dropping out of the switches controlling retardation, the coils of these switches are maintained energized after disconnection from the feed lines by the discharge of condensers connected respectively across the coils. Each switch in dropping out breaks the energizing circuit for another switch, thereby causing the switches to drop out in sequence.

A general idea of the invention, the mode of carrying it out which is at present preferred, and various features and advantages thereof will be gained from the above statements. Other features and advantages of the invention will be apparent from the following description and appended claims.

Figures 1, 1S:
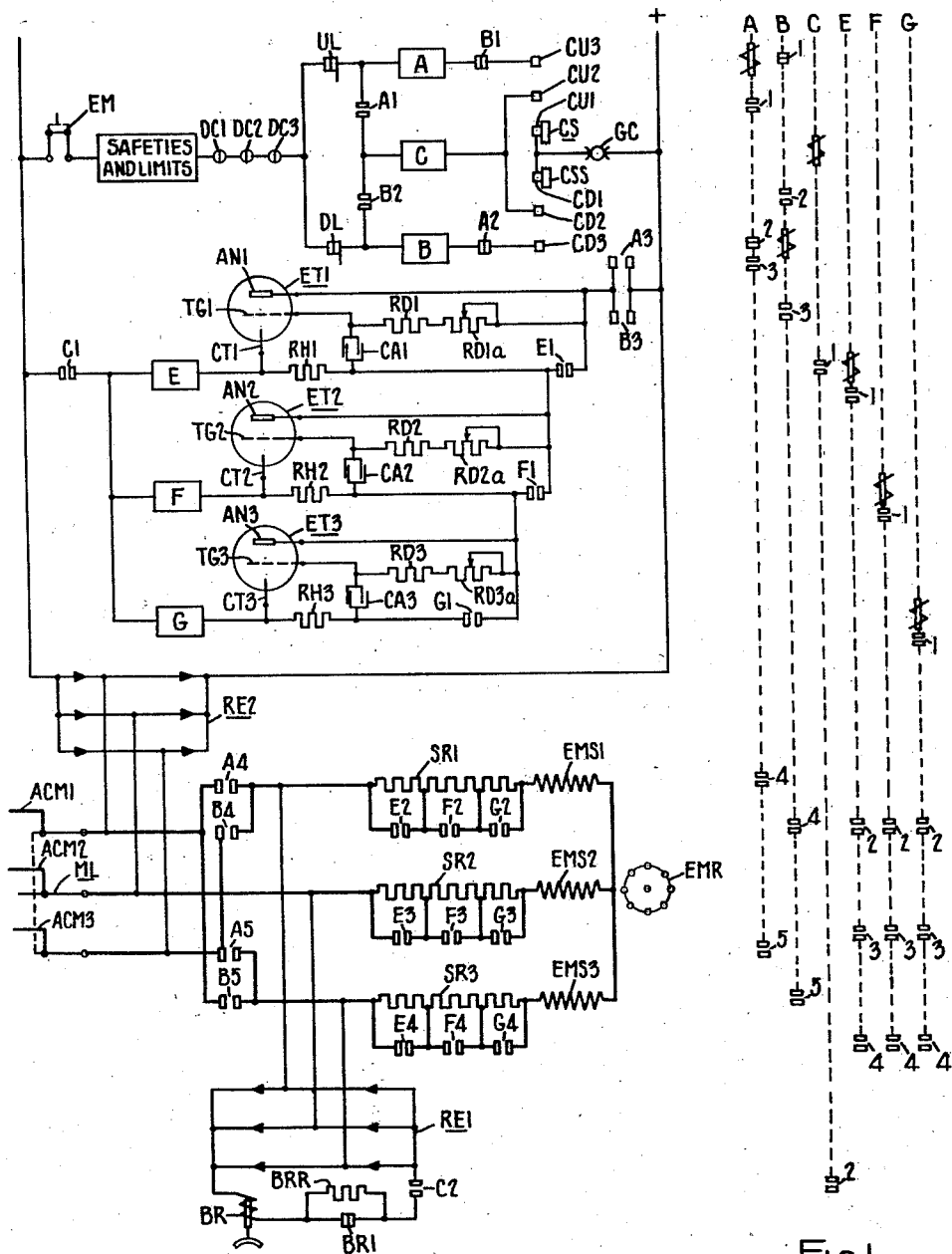
Figure 1 is a simplified schematic wiring diagram of an elevator control system in which a polyphase alternating current induction motor is utilized for raising and lowering the car with the operation of the accelerating switches to accelerate the car controlled in accordance with the invention.
Figures 1s, 2s and 3s are key diagrams for Figures 1, 2 and 3, respectively, showing the electromagnetic switches in spindle form with the contacts and coils arranged on the spindles in horizontal alignment with the corresponding contacts and coils in wiring diagrams.
Figures 2, 2S:
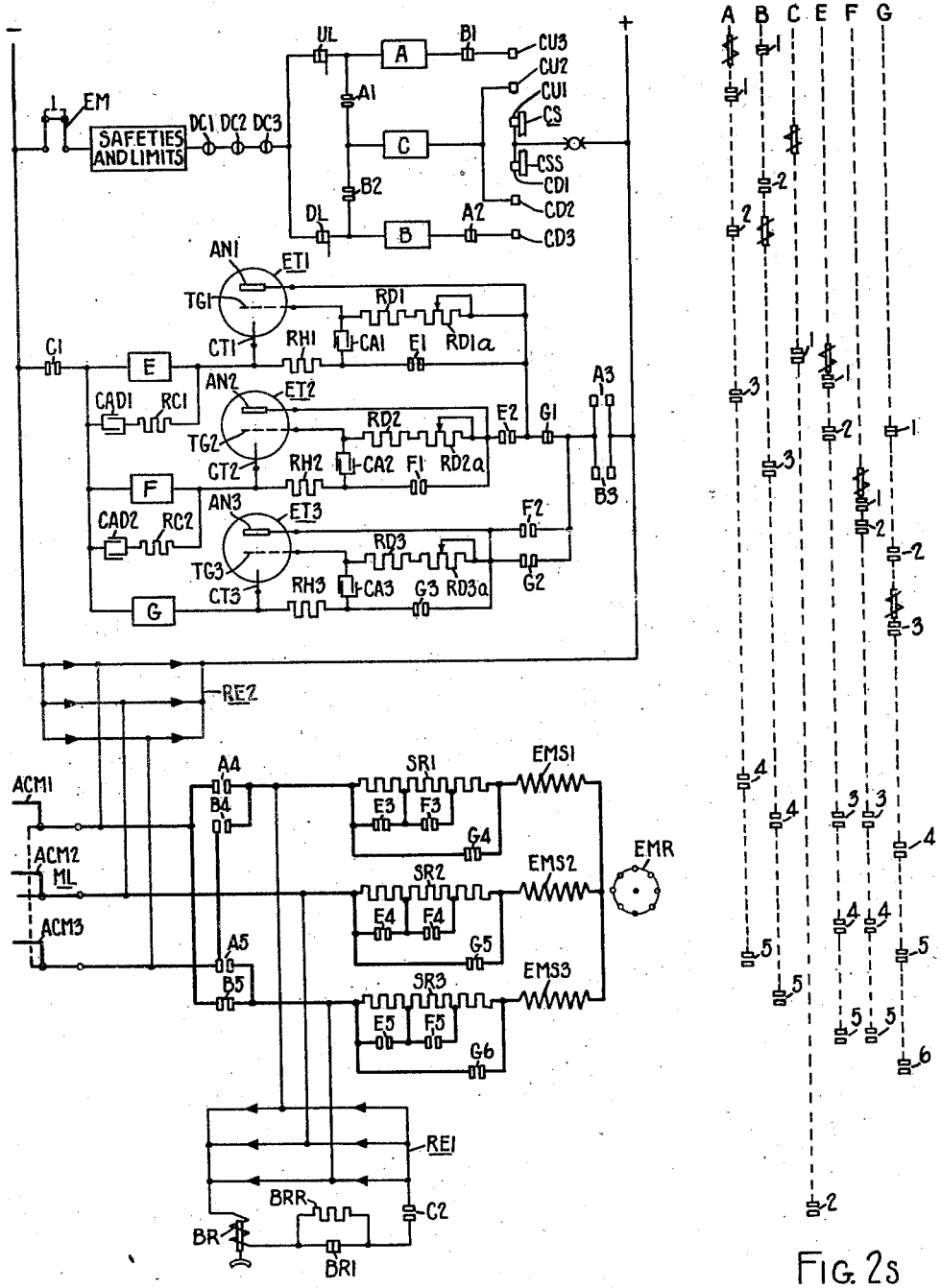
Figure 2 is a simplified schematic wiring diagram of an elevator control system illustrating variations which may be made in the circuits of Figure 1.
Figure 3:
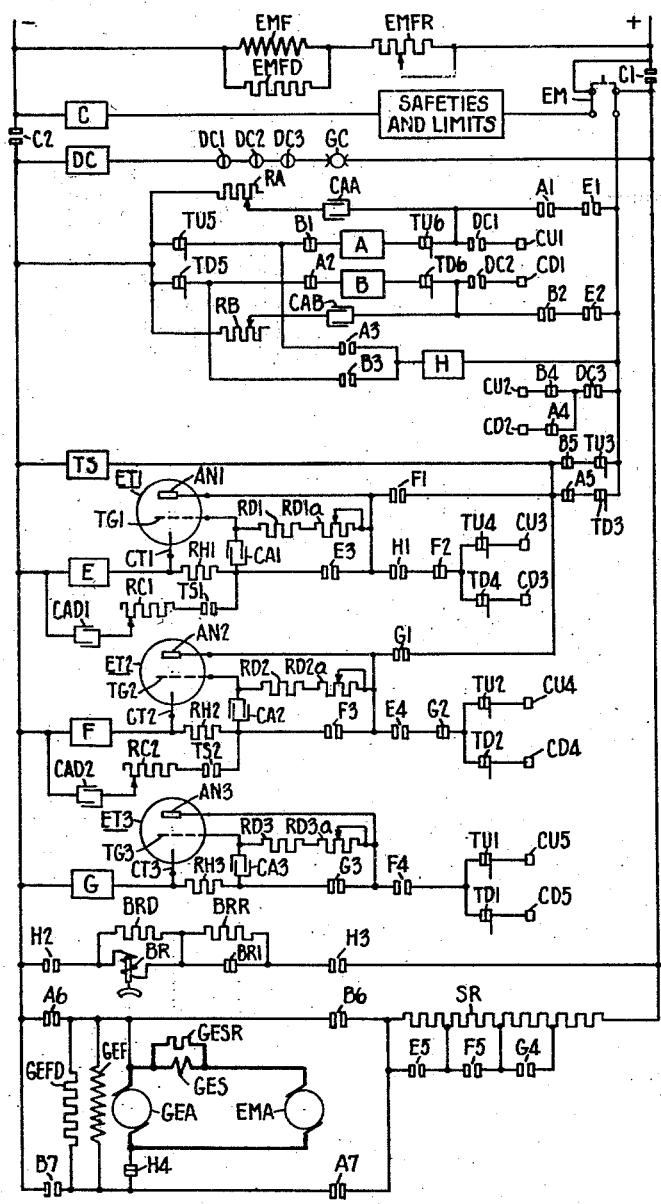
Figure 3 is a simplified schematic wiring diagram of an elevator control system in which a direct current motor is utilized for raising and lowering the car with the motor supplied with current from a variable voltage direct current generator and with the operation of the accelerating switches both to accelerate and retard the car controlled in accordance with the invention.
Figure 3S:
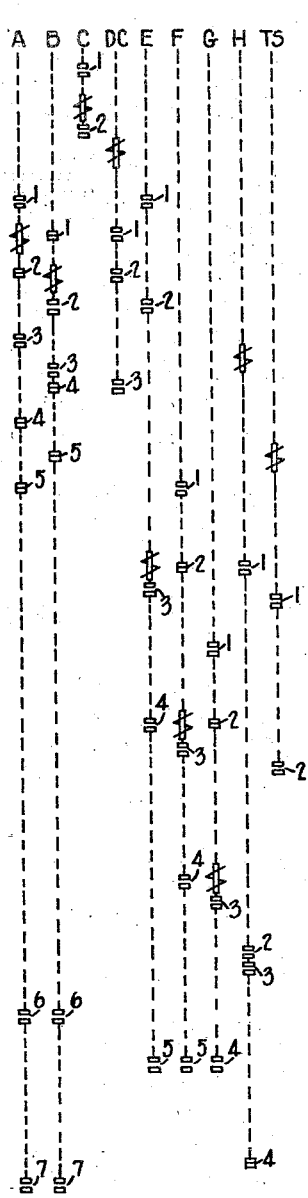

The circuits of Figures 1, 2 and 3 are shown in "straight" or "across the line" form, in which the coils and contacts of the electromagnetic switches are separated in such manner as to render the circuits as simple and direct as possible. The relationship of these coils and contacts may be seen from Figures 1s, 2s and 3s where the switches are arranged in alphabetical order and shown in spindle form. Positions of these coils and contacts in the wiring diagrams may be found by referring to the respective spindle diagrams where the coils and contacts are positioned on the spindles in horizontal alignment with the corresponding coils and contacts on the wiring diagrams.

Referring first to Figures 1 and 1s, the alternating current supply mains are designated ACM1, ACM2 and ACM3. A triple-pole manually operable main line switch designated ML is provided for controlling the supply of current from the supply mains to the system. The rotor of the elevator motor is designated EMR, while the stator windings are designated EMS1, EMS2 and EMS3. The resistances in circuit with the stator windings are designated SR1, SR2 and SR3. The release coil of the electromechanical brake is designated BR. This coil is illustrated as supplied with direct current derived from the alternating current mains, a rectifier RE1 being interposed between the supply mains and the release coil for this purpose. Similarly, the control circuits for the elevator motor are illustrated as supplied with direct current derived from the alternating current mains, rectifier RE2 being interposed between the supply mains and the control circuits for this purpose.

The control system illustrated is of the type in which both the starting and stopping of the car is controlled by an operator in the car. A car switch CS is provided in the car for the use of the operator in effecting starting and stopping of the car, the car switch segment being designated CSS and the stationary contacts engaged thereby being designated CU1, CU2 and CU3 for up car travel and CD1, CD2 and CD3 for down car travel. The gate contacts are designated GC, while the door contacts are designated DC. Three sets of door contacts are shown as indicative of a three floor installation. EM is an emergency stop switch in the car, while UL and DL are limit switches. Other safety and limit switches for convenience are indicated by legend within a frame.

The electromagnetic switches have been designated as follows:

A—Up direction switch
    B—Down direction switch
    C—Potential switch
    E—First accelerating switch
    F—Second accelerating switch
    G—Third accelerating switch Throughout the description which follows, these letters will be applied to the coils of the above designated switches. Also, with reference numerals appended thereto they will be applied to the contacts of these switches, as for example B3. Similarly, contacts operated by the brake upon being released are designated BR1.

The electronic tubes for controlling the operation of the accelerating switches are designated ET1, ET2 and ET3. These tubes are indicated as having an anode, cathode and grid and are preferably of the cold cathode gas-filled type. In the case of tube ET1, for example, the anode is designated AN1, the cathode CT1 and the grid or trigger TG1. CA1, CA2 and CA3 are condensers respectively connected across the cathode-grid of tubes ET1, ET2 and ET3 respectively. RD1, and RD1a, RD2 and RD2a and RD3 and RD3a are resistances in circuit with condensers CA1, CA2 and CA3 respectively for delaying the charging thereof, resistances RD1a, RD2a and RD3a being adjustable. These resistances are of relatively high value. Resistances RH1, RH2 and RH3 are of relatively low value and are utilized for shunting tubes ET1, ET2 and ET3 respectively. BRR is a cooling resistance for the brake release coil.

Assume that the hatchway doors and car gate are closed. To start the car in the up direction the car switch segment is moved into position to bridge contacts CU1, CU2 and CU3. This completes a circuit through emergency stop switch EM, safeties and limits, door contacts DC1, DC2 and DC3, up limit switch UL, coil of switch A, interlock contacts B1, car switch contacts CU3 and CU1, and gate contacts GC. Switch A upon operation separates interlock contacts A2 in the circuit for the coil of down direction switch B. It engages contacts A4 and A5 to complete a circuit for the stator windings of the hoisting motor, establishing a phase rotation of the applied voltage for starting the car in the up direction. It also engages contacts A1 to complete a circuit through car switch contact CU2 for the coil of potential switch C. The potential switch upon operation engages contacts C2 to complete a circuit for brake release coil BR to effect the release of the brake. The brake upon releasing separates contacts BR1 to insert cooling resistance BRR in circuit with the coil. The potential switch also engages contacts C1 completing a circuit for the coil of the first accelerating switch E through electronic tube ET1 and contacts A3.

The voltage applied to tube ET1 is insufficient to cause the tube to conduct current. Thus the first accelerating switch is not operated at this time. Condenser CA1 is connected across the grid-cathode of the tube in circuit with resistance RH1, and charging resistances RD1 and RD1a are connected in series with the condenser. The potential drop across the relatively high value resistances RD1 and RD1a delays the charging of the condenser. As the condenser charges, the voltage across the grid-cathode of the tube builds up and finally reaches a value to cause the flow of a minute current between the grid and the cathode. This fires the tube, causing the flow of current therethrough of a value to cause the operation of the first accelerating switch.

The first accelerating switch upon operation engages contacts E2, E3 and E4 to short-circuit a step of each of resistances SR1, SR2 and SR3 respectively to increase the available torque of the hoisting motor. Switch E also engages contacts E1 connecting resistance RH1 in shunt to the anode-cathode of tube ET1. This resistance being of relatively low value reduces the voltage across the anode-cathode of the tube to a point which causes the tube to cease conducting current. The first accelerating switch is maintained operated, however, its circuit extending through resistance RH1 and contacts E1.

Contacts E1 also complete a circuit for the coil of second accelerating switch F, this circuit extending through contact C1, tube ET2 and contacts A3. The operation of the second accelerating switch F is similarly delayed until condenser CA2 is charged to a point where the voltage across the grid-cathode of tube ET2 reaches the value at which the tube fires. Switch F upon operation engages contacts F2, F3 and F4 to short-circuit a further step of each of resistances SR1, SR2 and SR3 respectively to further increase the available torque of the hoisting motor. Switch F also engages contacts F1 connecting resistance RH2 across tube ET2 to put out the tube.

Contacts F1 also complete a circuit for the coil of third accelerating switch G through tube ET3. As in the case of switches E and F, the operation of switch G is delayed until condenser CA3 is charged to a point where the voltage applied to the grid-cathode of tube ET3 causes the tube to fire. Upon operation, switch G engages contacts G2, G3 and G4 to short-circuit the remaining steps of resistances SR1, SR2 and SR3 respectively to bring the available torque of the hoisting motor up to the value for full speed operation. Switch G also engages contacts G1 to connect resistance RH3 across tube ET3 to put out the tube.

The car is started in the down direction in a similar manner. The car switch segment is moved into position to bridge contacts CD1, CD2 and CD3. This causes the operation of down direction switch B and potential switch C to cause the application of voltage to the stator windings of the elevator hoisting motor and the release of the brake for starting the car. Switch B in engaging contacts B4 and B5 establishes a phase rotation of the voltage applied to the elevator hoisting motor for starting the car in the down direction. The engagement of contacts C1 and B3 completes a circuit for the coil of first accelerating switch E through electronic tube ET1. Upon the firing of this tube, switch E operates to cause increase in the available torque of the hoisting motor and to complete the circuit through the electronic tube ET2 for second accelerating switch F. Upon the firing of this tube, switch F operates to cause further increase in the available torque of the hoisting motor and to complete the circuit through electronic tube ET3 for the coil of the third accelerating switch. Upon the firing of this tube, switch F operates to cause the available torque of the hoisting motor to be brought up to a value for full speed operation of the hoisting motor. As in the case of starting the car in the up direction each accelerating switch upon operation shunts its associated electronic tube, putting the tube out of operation.

To stop the car, the car switch segment is centered breaking the circuit for the coils of the operated direction switch and potential switch. These switches upon dropping out disconnect the stator windings of the elevator hoisting motor from the supply lines and deenergize the brake release coil to apply the brake, bringing the car to a stop. Also, the dropping out of these switches breaks the circuit for the coils of accelerating switches which drop out in preparation for the next starting operation.

Various modifications of the control system illustrated in Figure 1 may be made. For example, in Figure 2, control circuits are arranged so that when the last accelerating switch operates it drops out the previously operated accelerating switches, the contacts of the last accelerating switch being connected across all of the torque controlling resistances for the elevator hoisting motor.

As in the case of the control arrangement for Figure 1, the car is started in the up direction by moving the car switch segment into position to bridge contacts CU1, CU2 and CU3 and in the down direction, by moving the segment into position to bridge contacts CD1, CD2 and CD3. Upon movement of the car switch segment to an operative position, the corresponding direction switch and the potential switch are operated to cause the application of voltage to the elevator hoisting motor and the deenergization of the brake release coil to release the brake. The engagement of contacts C1 and A3 establish a circuit for the coil of the first accelerating switch through electronic tube ET1. As in the case of the circuit of Figure 1, the first accelerating switch is not operated until the condenser CA1 charges to a point where the voltage across the grid-cathode of the tube reaches the value at which the tube fires. The first accelerating switch upon operation engages contacts E3, E4 and E5 to short-circuit a step of each of resistances SR1, SR2 and SR3 respectively, to increase the available torque of the hoisting motor. It also engages contacts E1 to put out the tube. In addition, it engages contacts E2 to establish a circuit for the coil of the second accelerating switch F through electronic tube ET2. When the voltage across the grid-cathode of this tube reaches the value at which the tube fires, switch F is operated to engage contacts F3, F4 and F5, short-circuiting a further step of each of the torque controlling resistances. It also engages contacts F1 to put out the tube and engages contacts F2 to complete a circuit for the coil of third accelerating switch G through electronic tube ET3. Upon the voltage across the grid-cathode of this tube reaching the value at which the tube fires switch G is operated to engage contacts G4, G5 and G6 completing a shunt circuit around each of resistances SR1, SR2 and SR3. Switch G also engages contacts G3 to put out tube ET3 and engages contacts G2 to by-pass contacts F2. At the same time switch G separates contacts G1 breaking the circuit for the coils of first and second accelerating switches E and F. Each of these switches has a condenser connected across its coil in circuit with resistance, the condenser and resistance for switch E being designated CAD1 and RC1 respectively and the condenser and resistance for switch F being designated CAD2 and RC2 respectively. These condensers are charged upon the application of voltage to the coils of their respective switches so that upon the breaking of the circuit for these coils the discharge of their condensers maintain the switches operated long enough to insure that the last accelerating switch G is fully operated before accelerating switches E and F drop out. In certain instances where the circuits are arranged as in Figure 2, contacts E1 and F1 may be omitted and the tube circuits broken upon the separation of contacts G1.

Referring now to Figures 3 and 3a, in which the invention is shown applied to a variable voltage system, the armature of the elevator hoisting motor is designated EMA and the field winding EMF. EMFR is a regulating resistance for the field winding while EMFD is a discharge resistance therefor. The armature of the supply generator for the elevator hoisting motor armature is designated GEA, its separately excited field winding GEF and its series field winding GES. GESR is a shunt resistance for the series field winding, while GEFD is a discharge resistance for the separately excited field winding. The voltage regulating resistance for the generator separately excited winding is designated SR. The driving motor for the generator is not shown. Also, the feed lines to the control circuit being designated + and —, it being understood that these may be supplied from an exciter driven by the generator driving motor or by a separate driving motor or they may be supplied in other ways, as for example, direct from the supply lines to the building where these lines are direct current supply lines of the proper voltage.

Various parts of the system are the same as in the circuit of Figures 1 and 2, and therefore will not be listed in detail. The electromagnetic switches in addition to switches A, B, C, E, F and G have been designated as follows:

DC—Door contact switch
H—Brake switch
TS—Terminal switch

The potential switch C instead of being subject to the car switch is arranged in circuit with various safeties and limit switches designated by legend and the emergency stop switch EM.

Figure 4:
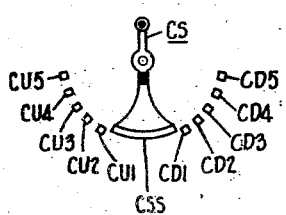
Figure 4 is a diagrammatic illustration of a car switch utilized in the circuits of Figure 3.

The car switch is provided with five stationary contacts on each side of neutral, those for up car travel being designated CU1, CU2, CU3, CU4 and CU5, and those for down car travel being designated CD1, CD2, CD3, CD4 and CD5. To avoid cross-overs of wires, the corresponding contacts on each side of neutral have been grouped to form pairs. The car switch segment CSS for bridging the car switch contacts is not shown in Figure 3, but the construction of the car switch is diagrammatically shown in Figure 4, to which reference may be made to facilitate an understanding of the operation of Figure 3. Contacts of a terminal stopping switch are included in the circuits, those contacts which open as the car reaches the upper terminal floors being designated TU1, TU2, TU3, TU4, TU5 and TU6 and being opened in the order named. The contacts which are opened as the car approaches the lower terminal floor are designated TD1, TD2, TD3, TD4, TD5 and TD6 and also are opened in the order named.

A discharge condenser CAD1 is connected across the coil of accelerating switch E to maintain the switch operated after the circuit of the coil is broken. RC1 is a regulating resistance for this discharge circuit. A discharge condenser CAD2 and regulating resistance RC2 are also provided for accelerating switch F. Similarly, CAA is a discharge condenser for the coil of up direction switch A, RA being a regulating resistance therefor, and CAB is a discharge condenser for the coil of down direction switch B, RB being a regultaing resistance therefor. BRD is a discharge resistance for the release coil of the electro-mechanical brake BR.

Assuming that power is supplied to the feed lines + and —, potential switch C is operated and contacts C1 and C2 in these feed lines are engaged. Also with potential switch operated, terminal switch TS is operated. With the hatchway doors and car gate closed, door contact switch DC is also operated. To start the car in the up direction the car switch segment is moved into position to bridge contacts CU1, CU2, CU3, CU4 and CU5. The bridging of contacts CU1 and CU2 completes a circuit from the negative supply line through contacts TU5 and B1, coil of up direction switch A, contacts TU6, DC1, B4 and DC3 and the right hand blade of emergency stop switch EM to the positive supply line. The up direction switch upon operation separates interlock contacts A2, A4 and A5. It also engages contacts A3 to complete a circuit through contacts TU5 for the coil of brake switch H. Switch H upon operation separates contacts H4 to disconnect the generator separately excited field winding GEF from the generator armature. It also engages contacts H2 and H3 to complete a circuit for the release coil of the electro-mechanical brake BR to release the brake for the starting operation. At the same time the up direction switch engages contacts A6 and A7 completing a circuit for generator field winding GEF through resistance SR, the polarity of the excitation of the generator field winding thus obtained being for causing voltage to be applied to the armature EMA of the elevator hoisting motor for starting the car in the up direction. The brake upon being released separates the brake contacts BR1 to insert cooling resistance BRR in circuit with the release coil.

The brake switch H upon operation also engages contacts H1 completing a circuit from the negative supply line for the coil of first accelerating switch E through the anode-cathode circuit of electronic tube ET1, contacts H1, F2 and TU4, car switch contacts CU3 and CU2, contacts B4 and DC3 and emergency switch EM to the positive supply line. As in the case of the circuit of Figures 1 and 2, the operation of the first accelerating switch is delayed until condenser CA1 is charged to a point that the voltage across the grid-cathode of tube ET1 reaches a value at which the tube fires. Switch E upon operation engages contacts E1 to complete a holding circuit through contacts A1 for the coil of up direction switch A, by-passing the car switch contact CU1. It also engages contacts E5 to short-circuit one step of resistance SR in circuit with the generator field winding, causing increase in the voltage applied to the armature of the elevator hoisting motor. It also engages contacts E3 to connect resistance RH1 across tube ET1 to put out the tube.

The first accelerating switch also engages contacts E4 completing a circuit for the coil of second accelerating switch F, this circuit extending through contacts G2 and TU2 and car switch contacts CU4 and CU2. The operation of switch F is delayed until condenser CA2 is charged to a point to cause tube ET2 to fire. Upon operation it engages contacts F1 to complete a holding circuit for coil of first accelerating switch E through contacts B5 and TU3, by-passing the car switch. It also engages contacts F5 to short-circuit another step of resistance SR in circuit with the generator field winding, causing further increase in the voltage applied to the armature of the elevator hoisting motor. It also engages contacts F3 to connect resistance RH2 across tube ET2 to put out the tube.

The second accelerating switch also engages contacts F4 completing a circuit for the coil of third accelerating switch G, this circuit extending through contacts TU1 and car switch contacts CU5 and CU2. Upon the expiration of the time interval provided by condenser CA3, its charging resistance RD3 and RD3a and electronic tube ET3, switch G operates to engage contacts G1 to establish a holding circuit for the coil of second accelerating switch F, by-passing the car switch. It also engages contacts G4 to short-circuit the last step of resistance SR to bring the generator voltage up to full value thereby bringing the elevator car up to full speed. It also engages contacts G3 to connect resistance RH3 across tube ET3 to put out the tube. It is to be noted that switch G also separates contacts G2 and switch F separates contacts F2, these contacts breaking the circuits for the coils of switches F and E respectively from the car switch, thereby obviating possible unwanted circuits.

The car is started in the down direction in a similar manner by throwing the car switch to its opposite position to bridge contacts CD1, CD2, CD3, CD4 and CD5. Other than the fact that the circuits are through the down contacts of the car switch and terminal stopping switch and that the down direction switch B is operated instead of the up direction switch A to cause the car to travel in the down direction, the operation is the same as described for starting the car in the up direction and will not be set forth.

To stop the car, the car switch is returned to neutral position. This breaks the circuit for the coil of third accelerating switch G which drops out immediately. In dropping out switch G separates contacts G4 to reinsert a step of resistance SR in circuit with the generator field winding, decreasing the generator voltage to initiate slowing down of the car. It also separates contacts G1 to break the circuit for the coil of the second accelerating switch F. This switch does not drop out immediately, being delayed by the discharge of condenser CAD2 into the coil of the switch. Upon the voltage across the coil of switch F falling to a certain value switch F drops out to separate contacts F5. This inserts another step of resistance SR in circuit with the generator field winding causing further decrease in generator voltage to further slow down the car. Switch F also separates contacts F1 to break the circuit for the coil of first accelerating switch E. Switch E is delayed in dropping out by the discharge of condenser CAD1 into the coil. Upon the voltage across its coil falling to a certain value switch E in turn drops out to separate contacts E5. This inserts the remaining step of resistance SR in circuit with the generator field winding causing further reduction in generator voltage to further slow down the car. Switch E also separates contacts E1 and E2. Assuming that the car has been travelling in the up direction and up direction switch A is operated the circuit for the coil of switch A is broken by the separation of contacts E1. Switch A does not drop out immediately being delayed by the discharge of condenser CAA into its coil. Upon the voltage across the coil decreasing to a certain value the direction switch drops out to separate contacts A6 and A7 breaking the circuit for the generator field winding. At the same time it separates contacts A3 to break the circuit for the coil of brake switch H which drops out to separate contacts H2 and H3. This breaks the circuit for the release coil of the electromechanical brake and the brake is applied to bring the car to a stop. At the same time contacts H4 engage to connect the generator field winding across the generator armature, the polarity of this connection being such as to oppose the voltage of the generator.

In making a stop at a terminal floor under conditions where the car switch is held in on position, the dropping out of the accelerating switches and direction switch is controlled by the terminal stopping switch. Assume that the car is approaching the upper terminal floor with the car switch held in on position. As it arrives a certain distance from this floor, terminal stopping switch contacts TU1 separate breaking the circuit for the coil of third accelerating switch G which drops out immediately. As the car continues its movement, terminal stopping switch contacts TU2 separate to break the circuit for the coil of second accelerating switch F. The dropping out of the switch is delayed by the discharge of condenser CAD2. However, further movement of the car causes opening of terminal stopping switch contacts TU3 which breaks the circuit for the coil of terminal switch TS. This switch drops out to separate contacts TS1 and TS2 breaking the condenser discharge circuits across the coils of switches E and F respectively. Thus, switch F is not further delayed in dropping out and upon further movement of the car to open terminal stopping switch contacts TU4 the circuit of the coil of first accelerating switch E is broken and this switch drops out immediately. Just before the car reaches the upper terminal floor terminal stopping switch contacts TU5 and TU6 open breaking the circuit for the coil of up direction switch A. The discharge circuit for condenser CAA being connected outside contacts TU5 and TU6, this also breaks the discharge circuit for this condenser so that the up direction switch A drops out immediately. Thus, in making the stop at a terminal floor, distance control of the retardation is effected. However, should the car switch be centered during the stopping of the car in response to the operation of the terminal stopping switch say for the upper terminal floor, as for example immediately after the opening of terminal stopping switch contacts TU3, immediate dropping out of the up direction switch and thus a sudden stop is prevented by the discharge of condenser CAA into the coil of the direction switch to maintain this switch operated.

It is seen therefore from the various examples given above that the acceleration of a motor is controlled in a very simple and reliable manner by controlling the timing of the accelerating switches by electronic tubes, the firing of which is in turn controlled by condensers. The duration of the timing is dependent upon the capacity of the condensers and value of the resistances employed, any fine adjustments being effected by adjusting the value of the resistances. Each accelerating switch upon operation connects a resistance in shunt to the tube, thereby reducing the voltage across the tube to below sustaining value. This put out the tube, adding greatly to its useful life.

It is to be understood that the systems of control illustrated are simply by way of example. The number of accelerating steps in each case depends upon the requirements of the particular installation, three being shown as illustrative. Although a car switch control elevator system has been described, it is to be understood that the invention is applicable to other forms of elevator systems such as push button control systems. The invention is equally applicable to elevator systems in which acceleration is timed but with retardation distance controlled, as for example in the systems shown in the patent to Waters et al. No. 2,074,575 granted March 23, 1937 and the patent to Waters et al. No. 2,100,176 granted November 23, 1937. The invention also is applicable to other control systems in which the acceleration of a motor is timed.

Many elevator control systems are very complex and admit many variations. In applying the invention to such control systems changes may be made with the view of adapting the invention more readily to such systems. Other changes may also be made which do not depart from the spirit and scope of the invention. It is therefore intended that all matter contained in the above description and shown in the accompanying drawings shall be interpreted as illustrative and not in a limiting sense.

What is claimed is:

1. In a control system for an electric motor in which the operation of the motor during starting is controlled by a plurality of electromagnetic switches operating in sequence, an electronic tube with grid control for each switch, the anode-cathode of the tube being connected in series with the coil of the switch, a condenser for each tube connected across the grid-cathode of the tube and a charging resistance for each condenser for delaying the operation of the switch for which the tube is provided until the condenser charges to a point where the voltage across the grid-cathode of the tube is sufficient to cause the tube to fire, and means responsive to the operation of each switch for shunting the anode-cathode of the electronic tube for such switch to reduce the voltage across the anode-cathode of such tube to below sustaining value.

2. In a control system for an electric motor in which the operation of the motor during starting is controlled by a plurality of electromagnetic switches operating in sequence, a cold cathode gas filled electronic tube with grid control for each switch, the anode-cathode of the tube being connected in series with the coil of the switch, a condenser for each tube connected across the grid-cathode of the tube and a charging resistance for each condenser for delaying the operation of the switch for which the tube is provided until the condenser charges to a point where the voltage across the grid-cathode of the tube is sufficient to cause the tube to fire, means operable in starting the motor for completing the circuit for the coil of one of said switches and responsive to the operation of each switch for completing the circuit for the coil of the next switch, and means responsive to the operation of each switch for shunting the anode-cathode of the electronic tube for such switch to reduce the voltage across the anode-cathode of such tube to below sustaining value.

3. In a control system for an electric motor in which the operation of the motor during starting is controlled by resistance which is short-circuited in steps by a plurality of electromagnetic switches operating in sequence, the last of said switches to operate short-circuiting the steps of resistance short-circuited by the previously operated switches plus an additional step, a cold cathode gas filled electronic tube with grid control for each switch, the anode-cathode of the tube being connected in series with the coil of the switch, a condenser for each tube connected across the grid-cathode of the tube and charging resistance for each condenser for delaying the operation of the switch for which the tube is provided until the condenser charges to a point where the voltage across the grid-cathode of the tube is sufficient to cause the tube to fire, means operable in starting the motor for completing the circuit for the coil of one of said switches and responsive to the operation of each switch for completing the circuit for the coil of the next switch, and means responsive to the operation of the last switch for shunting the anode-cathode of the electronic tube for such switch to reduce the voltage across the anode-cathode of such tube to below sustaining value and for breaking the circuits for the coils of the previously operated switches.

4. In a control system for an elevator hoisting motor in which the operation of the motor during starting is controlled by a plurality of electromagnetic switches operating in sequence, a source of direct current, a cold cathode gas filled electronic tube with grid control for each switch, a condenser for each tube connected across the grid-cathode of the tube, a charging resistance for each condenser, means operable in starting the car for connecting the coil of one of said switches to said source in series with the anode-cathode of the electronic tube provided therefor and for completing the charging circuit for the condenser for such tube through the charging resistance for such condenser, and means responsive to the operation of each switch for shunting the anode-cathode of the electronic tube for such switch and for connecting the coil of the next switch to said source in series with the anode-cathode of the electronic tube provided for said next switch and for completing the charging circuit for the condenser for such tube through the charging resistance for such condenser, the operation of each switch thus being delayed until the condenser for its tube charges to a point where the voltage across the grid-cathode of the tube is sufficient to cause the tube to fire and upon operation of each accelerating switch the voltage across the anode-cathode of its electronic tube being reduced to below sustaining value.

5. In a control system for an elevator hoisting motor in which acceleration of the motor is controlled by resistance which is short-circuited by a plurality of accelerating switches, a source of direct current, a cold cathode gas filled electronic tube with grid control for each accelerating switch, a condenser for each tube connected across the grid-cathode of the tube, a resistance for each condenser connected across the grid-anode of the tube for controlling the charging of the condenser, means operable in starting the car for connecting the coil of one of said accelerating switches to said source in series with the anode-cathode of the electronic tube provided therefor, and means responsive to the operation of each accelerating switch for short-circuiting the condenser for the tube for such switch and the charge controlling resistance for such condenser and for connecting the coil of the next accelerating switch to said source in series with the anode-cathode of the electronic tube provided for said next switch, the operation of each accelerating switch thus being delayed until the condenser for its tube charges to a point where the voltage across the grid-cathode of the tube is sufficient to cause the tube to fire and upon operation of each accelerating switch the voltage across the anode-cathode of its electronic tube being reduced to below sustaining value.

6. In a control system for a direct current elevator hoisting motor supplied with current from a variable voltage direct current generator having a separately excited field winding the excitation of which is controlled by resistance in series therewith, in which direction switches are provided which are responsive to the operation of start control means for connecting said winding to a source of current and in which a plurality of accelerating switches are provided for short-circuiting said resistance in steps, a cold cathode gas filled electronic tube with grid control for each accelerating switch, a current limiting resistance for each accelerating switch, a condenser for each tube connected in series with the current limiting resistance for the switch for which the tube is provided across the grid-cathode of the tube, a resistance for each condenser connected across the grid-anode of the tube for controlling the charging of the condenser, means responsive to the operation of a direction switch in starting the car for connecting the coil of one of said accelerating switches to said source in series with the anode-cathode of the electronic tube provided therefor, and means responsive to the operation of each accelerating switch for short-circuiting the condenser and its charge controlling resistance and for connecting the coil of the next accelerating switch to said source in series with the anode-cathode of the electronic tube provided for said next switch, the operation of each accelerating switch thus being delayed until the condenser for its tube charges to a point where the voltage across the grid-cathode of the tube is sufficient to cause the tube to fire and upon operation of each accelerating switch the voltage across the anode-cathode of its electronic tube being reduced to a value to put out the tube.

7. In a control system for a direct current elevator hoisting motor supplied with current from a variable voltage direct current generator having a separately excited field winding the excitation of which is controlled by resistance in series therewith, in which direction switches are provided which are responsive to the operation of a car switch in the car for connecting said winding to a source of current and in which a plurality of accelerating switches also subject to said car switch are provided for short-circuiting said resistance in steps, a cold cathode gas filled electronic tube with grid control for each accelerating switch, a condenser for each tube connected across the grid-cathode of the tube, a resistance for each condenser connected in series therewith and across the grid-anode of the tube for controlling the charging of the condenser, means responsive to the operation of a direction switch in starting the car for connecting the coil of one of said accelerating switches to said source in series with the anode-cathode of the electronic tube provided therefor, means responsive to the operation of each accelereating switch for short-circuiting the condenser and its charge controlling resistance and for connecting the coil of the next accelerating switch to said source in series with the anode-cathode of the electronic tube provided for said next switch, the operation of each accelerating switch thus being delayed until the condenser for its tube charges to a point where the voltage across the grid-cathode of the tube is sufficient to cause the tube to fire and upon operation of each accelerating switch the voltage across the anode-cathode of its electronic tube being reduced to a value to put out the tube, means responsive to the operation of said one accelerating switch for establishing a holding circuit for the operated direction switch independent of the car switch, means responsive to each of the other accelerating switches for establishing a holding circuit for the next preceding operated accelerating switch independent of the car switch, and a condenser and resistance for each direction switch and each accelerating switch except the last connected in series across the coil of the switch to delay the dropping out thereof upon the return of the car switch to off position.

8. In a control system for a polyphase alternating current elevator hoisting motor supplied with current from a source of polyphase alternating current in which the operation of the motor during starting is controlled by resistance in circuit with its stator windings which is short-circuited in steps by a plurality of electromagnetic switches operating in sequence, a source of direct current derived from said alternating current source for the coils of said switches, a cold cathode gas filled electronic tube with grid control for each switch, the anode-cathode of the tube being connected in series with the coil of the switch, a condenser for each tube connected across the grid-cathode of the tube and a charging resistance for each condenser for delaying the operation of the switch for which the tube is provided until the condenser charges to a point where the voltage across the grid-cathode of the tube is sufficient to cause the tube to fire, means operable in starting the motor for connecting the coil of one of said switches in circuit with the anode-cathode of the electronic tube provided therefore to said direct current source and responsive to the operation of each switch for connecting the coil of the next switch in circuit with the anode-cathode of the electronic tube provided therefor to said direct current source, and means responsive to the operation of each switch for shunting the anode-cathode of the electronic tube for such switch to reduce the voltage across the anode-cathode of such tube to below sustaining value.

ANTHONY PINTO.